(12) United States Patent
Iseyama et al.

(10) Patent No.: US 6,792,264 B1
(45) Date of Patent: Sep. 14, 2004

(54) RECEPTION FORCING METHOD FOR MOBILE COMMUNICATION SYSTEM, MOBILE COMMUNICATION SYSTEM AND MANAGING CENTER

(75) Inventors: Takayuki Iseyama, Kawasaki (JP); Hiroyo Masuda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 705 days.

(21) Appl. No.: 09/590,582

(22) Filed: Jun. 8, 2000

(30) Foreign Application Priority Data

Aug. 9, 1999 (JP) .......................................... 11-225121

(51) Int. Cl.⁷ .............................................. H04M 3/42
(52) U.S. Cl. ................. 455/414.1; 455/433; 455/435.1; 455/560; 455/422.1; 455/428; 455/445; 455/456.2; 455/456.5
(58) Field of Search .............................. 455/414.1, 433, 455/435.1, 411, 425, 422, 428, 456.1, 456.5, 456.2, 445, 458, 560, 422.1

(56) References Cited

U.S. PATENT DOCUMENTS

| | | | | | |
|---|---|---|---|---|---|
| 6,018,573 | A | * | 1/2000 | Tanaka ................... | 379/211.02 |
| 6,018,657 | A | * | 1/2000 | Kennedy et al. ......... | 455/426.1 |
| 6,081,725 | A | * | 6/2000 | Ishida ........................ | 455/462 |
| 6,088,589 | A | * | 7/2000 | Valentine et al. ........... | 455/433 |
| 6,091,945 | A | * | 7/2000 | Oka ............................ | 455/411 |
| 6,122,509 | A | * | 9/2000 | Nguyen ....................... | 455/433 |
| 6,137,791 | A | * | 10/2000 | Frid et al. .................... | 370/352 |
| 6,138,007 | A | * | 10/2000 | Bharatia ................... | 455/414.1 |
| 6,161,012 | A | * | 12/2000 | Fenton et al. ............. | 455/432.2 |
| 6,233,457 | B1 | * | 5/2001 | Wiehe ......................... | 455/445 |

FOREIGN PATENT DOCUMENTS

| | | |
|---|---|---|
| JP | 3-180231 | 7/1988 |
| JP | 3-54955 | 3/1991 |
| JP | 4-150544 | 5/1992 |
| JP | 5-75536 | 3/1993 |
| JP | 6-169340 | 6/1994 |
| JP | 6-177954 | 6/1994 |
| JP | 6-225020 | 8/1994 |
| JP | 6-268737 | 9/1994 |
| JP | 6-337997 | 12/1994 |
| JP | 7-221843 | 8/1995 |
| JP | 7-236129 | 9/1995 |
| JP | 7-298241 | 11/1995 |
| JP | 7-327076 | 12/1995 |
| JP | 8-191480 | 7/1996 |
| JP | 8-289367 | 11/1996 |
| JP | 9-98224 | 4/1997 |
| JP | 9-121256 | 5/1997 |
| JP | 10-65808 | 3/1998 |
| JP | 10-75299 | 3/1998 |
| JP | 10-224864 | 8/1998 |

* cited by examiner

*Primary Examiner*—Marceau Milord
(74) *Attorney, Agent, or Firm*—Katten Muchin Zavis Rosenman

(57) ABSTRACT

A reception forcing method is used in a mobile communication system which includes a managing center. The method includes the steps of registering in advance identification information which is related to each caller permitted to make a forced reception in the managing center, originating a call from a caller by adding identification information of the caller when making a forced reception at a destination subscriber, and forcing a reception at the destination subscriber by avoiding a screening function of the destination subscriber regardless of whether or not the screening function of the destination subscriber is turned ON, if the identification information of the caller is registered in the managing center.

20 Claims, 7 Drawing Sheets

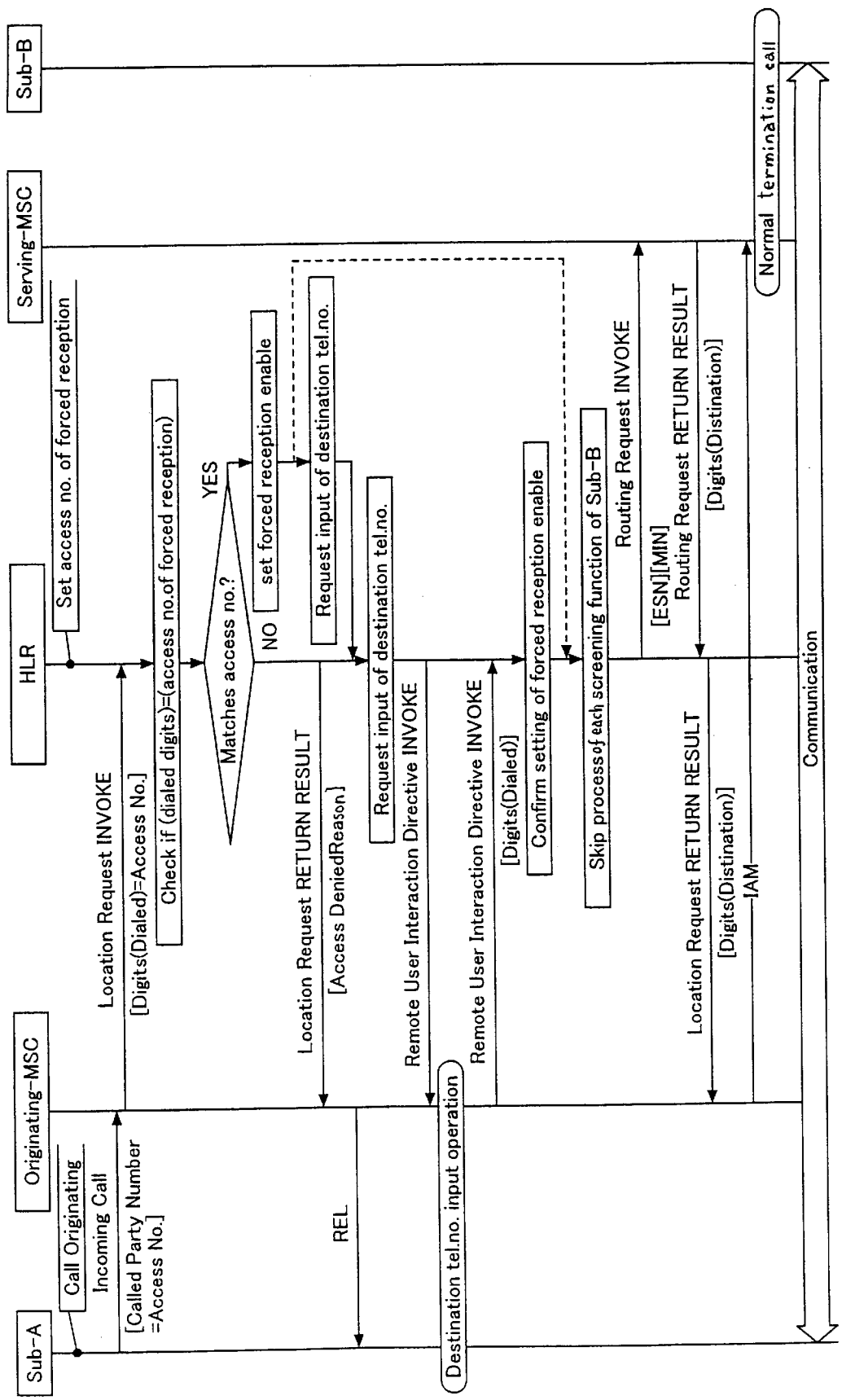

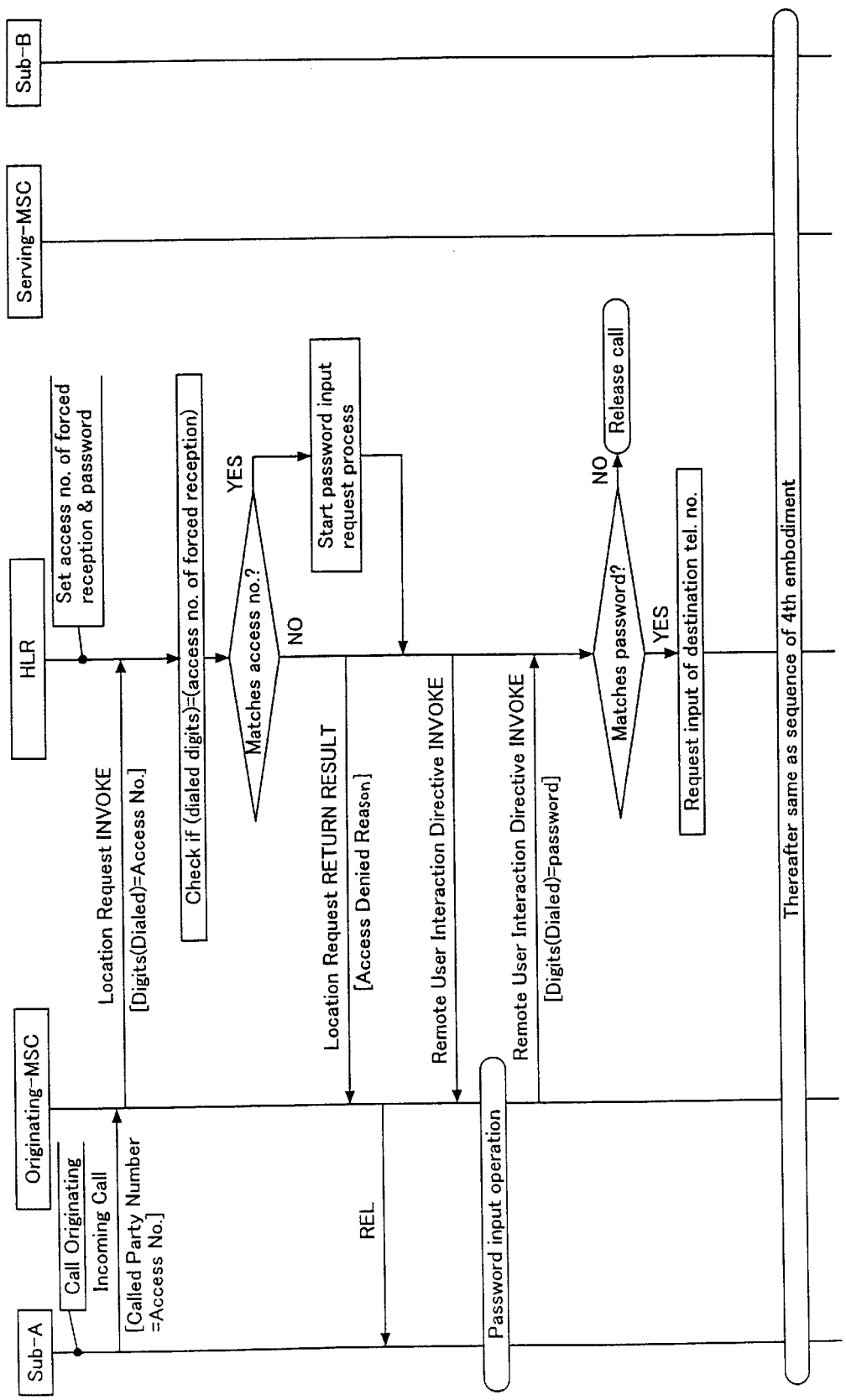

US 6,792,264 B1

RECEPTION FORCING METHOD FOR MOBILE COMMUNICATION SYSTEM, MOBILE COMMUNICATION SYSTEM AND MANAGING CENTER

BACKGROUND OF THE INVENTION

1. Field of the Invention

The present invention generally relates to reception forcing methods for mobile communication systems, mobile communication systems and managing centers, and more particularly to a reception forcing method for making a forced reception at a subscriber who subscribes to a so-called screening service in a mobile communication system, to a mobile communication system which employs such a reception forcing method, and to a managing center within such a mobile communication system.

2. Description of the Related Art

A screening function enables rejection of all incoming calls, accepting only incoming calls with a predetermined password, rejecting an incoming call from a caller who is registered in a call rejection list, for example. In the mobile communication system, the subscriber can utilize the above described screening function by subscribing to the screening service.

FIG. 1 is a system block diagram generally showing an example of a conventional mobile communication system which provides the screening service. This mobile communication system employs the code division multiple access (CDMA) as the access system to and from the mobile terminals. As shown in FIG. 1, mobile switching centers (MSCs) 3(1), 3(2), 3(3), ... accommodate base stations 2(1), 2(2), 2(3), 2(4), 2(5), 2(6), ..., and the base stations 2(1) through 2(6), ... connect to mobile terminals 1A, 1B, ... via radio lines. The MSCs 3(1), 3(2), 3(3), ... are mutually connected via mobile trunk centers 4(1), 4(2), .... Home memory centers 5(1), ... are provided in this mobile communication system, as managing centers. The home memory centers 5(1), ... are connected to the MSCs 3(1), 3(2), 3(3), ... via signaling lines, and manage position information and the like of each of the mobile terminals 1A, 1B, .... The position information and the like are stored and managed in hole location registers (HLRs) of the home memory centers 5(1), ....

FIG. 2 is a diagram generally showing an example of a conventional signaling sequence with the screening function. For the sake of convenience, it is assumed that a subscriber A of the mobile terminal 1A calls a subscriber B of the mobile terminal 1B which subscribes to the screening service. When the subscriber A originates a call with a calling party (source) telephone number Sub-A and a called party (destination) telephone number Sub-B, the MSC 3(1) on the originating end (originating-MSC) inquires the position information and the like of the destination subscriber B to the home memory center 5(1) by a location request INVOKE. The home memory center 5(1) checks service start conditions of the subscriber B, and judges whether or not the screening function of the subscriber B is turned ON. If the screening function of the subscriber B is turned ON, the home memory center 5(1) carries out various processes of the screening function, such as releasing the call, and returns a location response RETURN RESULT with the access rejecting reasons to the originating-MSC 3(1). The originating-MSC 3(1) releases the connection with the subscriber A in response to the location response RETURN RESULT.

On the other hand, in a case where the screening function of the subscriber B is turned OFF, the home memory center 5(1) sends a routing request INVOKE to the MSC 3(3) on the serving end (serving-MSC). When a routing response RETURN RESULT is received from the serving-MSC 3(3) in response to the routing request INVOKE, the home memory center 5(1) sends a location response RETURN RESULT to the originating-MSC 3(1) in response to the routing response RETURN RESULT. As a result, the originating-MSC 3(1) sends an initial address message IAM and the like to the serving-MSC 3(3), and the serving-MSC 3(3) carries out a normal termination call sequence between the destination subscriber B and sets a line. Hence, a communication becomes possible between the source subscriber A and the destination subscriber B.

According to the existing screening service, if the destination subscriber subscribes to the screening service and turns the screening function ON, the destination subscriber also does not accept a call from a specific source other than the general user, even if the specific source is a network manager. In other words, the screening service does not enable the subscriber to accept a call without changing the subscriber conditions of the screening function, that is, to accept a call in a state where the screening function is turned ON.

For this reason, even in a case where the network manager wishes to make an important notification to the subscriber of the screening service, for example, there was no means of notifying the subscriber in a state where the screening function is turned ON. In order to make such a notification, the subscriber must once turn OFF the screening function by himself, and the existing screening service may not necessarily be satisfactory from the point of view of the system maintenance.

SUMMARY OF THE INVENTION

Accordingly, it is a general object of the present invention to provide a novel and useful reception forcing method for mobile communication system, a mobile communication system and a managing center, in which the problems described above are eliminated.

Another and more specific object of the present invention is to provide a reception forcing method for mobile communication system, a mobile communication system and a managing center, which enable a call from a specific source such as a network manager to be accepted by a subscriber without changing the subscriber conditions of the screening function or the service start conditions.

Still another object of the present invention to provide a reception forcing method for a mobile communication system which includes a managing center, comprising the steps of (a) registering in advance identification information which is related to each caller permitted to make a forced reception in the managing center, (b) originating a call from a caller by adding identification information of the caller when making a forced reception at a destination subscriber, and (c) forcing a reception at the destination subscriber by avoiding a screening function of the destination subscriber regardless of whether or not the screening function of the destination subscriber is turned ON, if the identification information of the caller is registered in the managing center. According to the reception forcing method of the present invention, it is possible to enable a call from a specific source such as a network manager to be accepted by a subscriber without changing the subscriber conditions of the screening function or the service start conditions.

A further object of the present invention is to provide a reception forcing method for a mobile communication system which includes a managing center, comprising the steps of (a) registering in advance each access number which permits a forced reception in the managing center, (b) originating a call from a caller by using a called party telephone number as the access number when making a forced reception at a destination subscriber, and (c) forcing a reception at the destination subscriber by avoiding a screening function of the destination subscriber regardless of whether or not the screening function of the destination mobile terminal is turned ON, by obtaining the called party telephone number from the caller if the access number of the destination subscriber is registered in the managing center. According to the reception forcing method of the present invention, it is possible to enable a call from a specific source such as a network manager to be accepted by a subscriber without changing the subscriber conditions of the screening function or the service start conditions.

Another object of the present invention is to provide a mobile communication system comprising a managing center managing position information of mobile terminals and registering in advance identification information which is related to each caller permitted to make a forced reception, means for originating a call from a caller by adding identification information of the caller when making a forced reception at a destination subscriber, and means for forcing a reception at the destination subscriber by avoiding a screening function of the destination subscriber regardless of whether or not the screening function of the destination subscriber is turned ON, if the identification information of the caller is registered in the managing center. According to the mobile communication system of the present invention, it is possible to enable a call from a specific source such as a network manager to be accepted by a subscriber without changing the subscriber conditions of the screening function or the service start conditions.

Still another object of the present invention is to provide a mobile communication system comprising a managing center managing position information of mobile terminals and registering in advance each access number which permits a forced reception, means for originating a call from a caller by using a called party telephone number as the access number when making a forced reception at a destination subscriber, and means for forcing a reception at the destination subscriber by avoiding a screening function of the destination subscriber regardless of whether or not the screening function of the destination subscriber is turned ON, by obtaining the called party telephone number from the caller if the access number of the destination subscriber is registered in the managing center. According to the mobile communication system of the present invention, it is possible to enable a call from a specific source such as a network manager to be accepted by a subscriber without changing the subscriber conditions of the screening function or the service start conditions.

A further object of the present invention is to provide a managing center for managing position information of mobile terminals used in a mobile communication system, comprising registering means for registering in advance identification information which is related to each caller permitted to make a forced reception, means for receiving a call which is originated from a caller, added with identification information of the caller, and instructing a forced reception at a destination subscriber, and means for forcing a reception at the destination subscriber by avoiding a screening function of the destination subscriber regardless of whether or not the screening function of the destination subscriber is turned ON, if the identification information of the caller is registered in the registering means. According to the managing center of the present invention, it is possible to enable a call from a specific source such as a network manager to be accepted by a subscriber without changing the subscriber conditions of the screening function or the service start conditions.

Another object of the present invention is to provide a managing center for managing position information of mobile terminals used in a mobile communication system, comprising registering means for registering in advance each access number which permits a forced reception, means for receiving a call originated from a caller, using a called party telephone number as the access number, and instructing a forced reception at a destination subscriber, and means for forcing a reception at the destination subscriber by avoiding a screening function of the destination subscriber regardless of whether or not the screening function of the destination mobile terminal is turned ON, by obtaining the called party telephone number from the caller if the access number of the destination subscriber is registered in the registering means. According to the managing center of the present invention, it is possible to enable a call from a specific source such as a network manager to be accepted by a subscriber without changing the subscriber conditions of the screening function or the service start conditions.

Other objects and further features of the present invention will be apparent from the following detailed description when read in conjunction with the accompanying drawings.

BRIEF DESCRIPTION OF THE DRAWINGS

FIG. 6 is a diagram generally showing a signaling sequence of a fourth embodiment of the reception forcing method for mobile communication system according to the present invention; and FIG. 7 is a diagram generally showing a signaling sequence of a fifth embodiment of the reception forcing method for mobile communication system according to the present invention.

DESCRIPTION OF THE PREFERRED EMBODIMENTS

Various embodiments of the present invention will now be describe with reference to FIGS. 1 and 3 through 7.

First Embodiment

Figure 3:
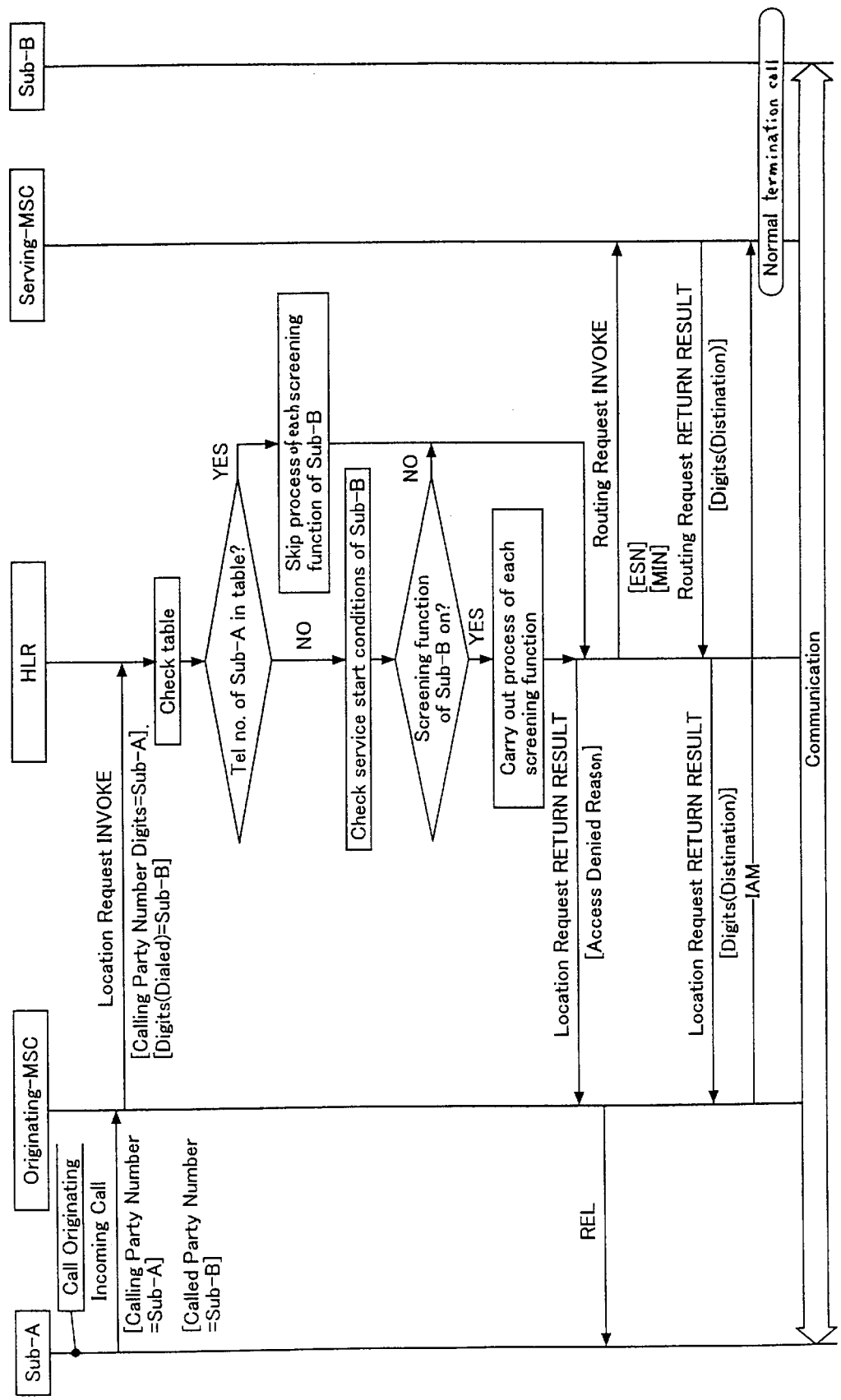
FIG. 3 is a diagram generally showing a signaling sequence of a first embodiment of a reception forcing method for mobile communication system according to the present invention.

FIG. 3 is a diagram generally showing a signaling sequence of a first embodiment of a reception forcing method for mobile communication system according to the present invention. This first embodiment of the reception forcing method is applied to a first embodiment of a mobile communication system according to the present invention, which employs a first embodiment of a managing center according to the present invention. This first embodiment of the mobile communication system has the same basic system structure as the conventional mobile communication system shown in FIG. 1, except for the operation described hereunder. This first embodiment of the mobile communication system also employs the CDMA as the access system.

Figure 1:
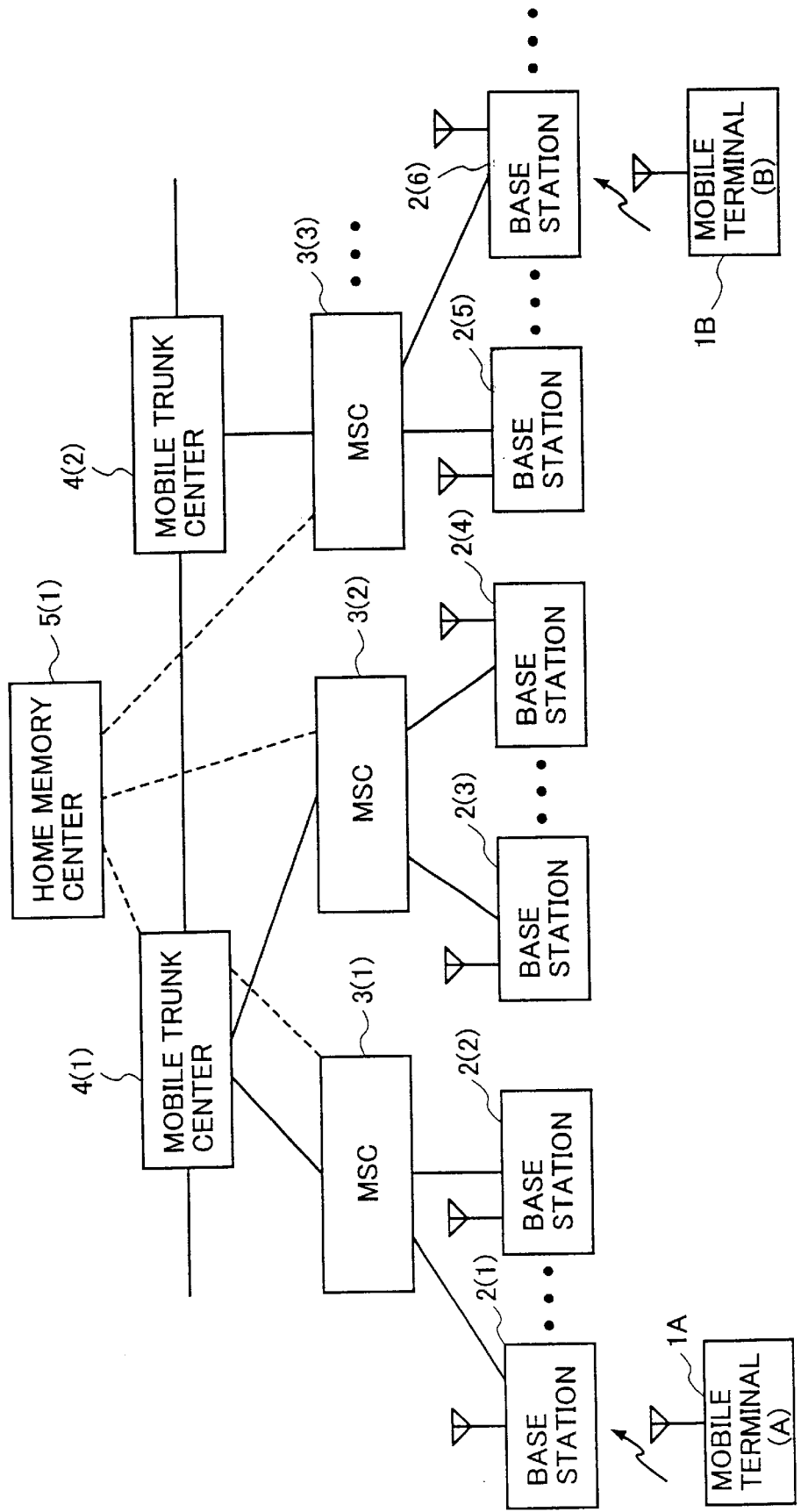
FIG. 1 is a system block diagram generally showing an example of a conventional mobile communication system which provides the screening service.
Figure 2:
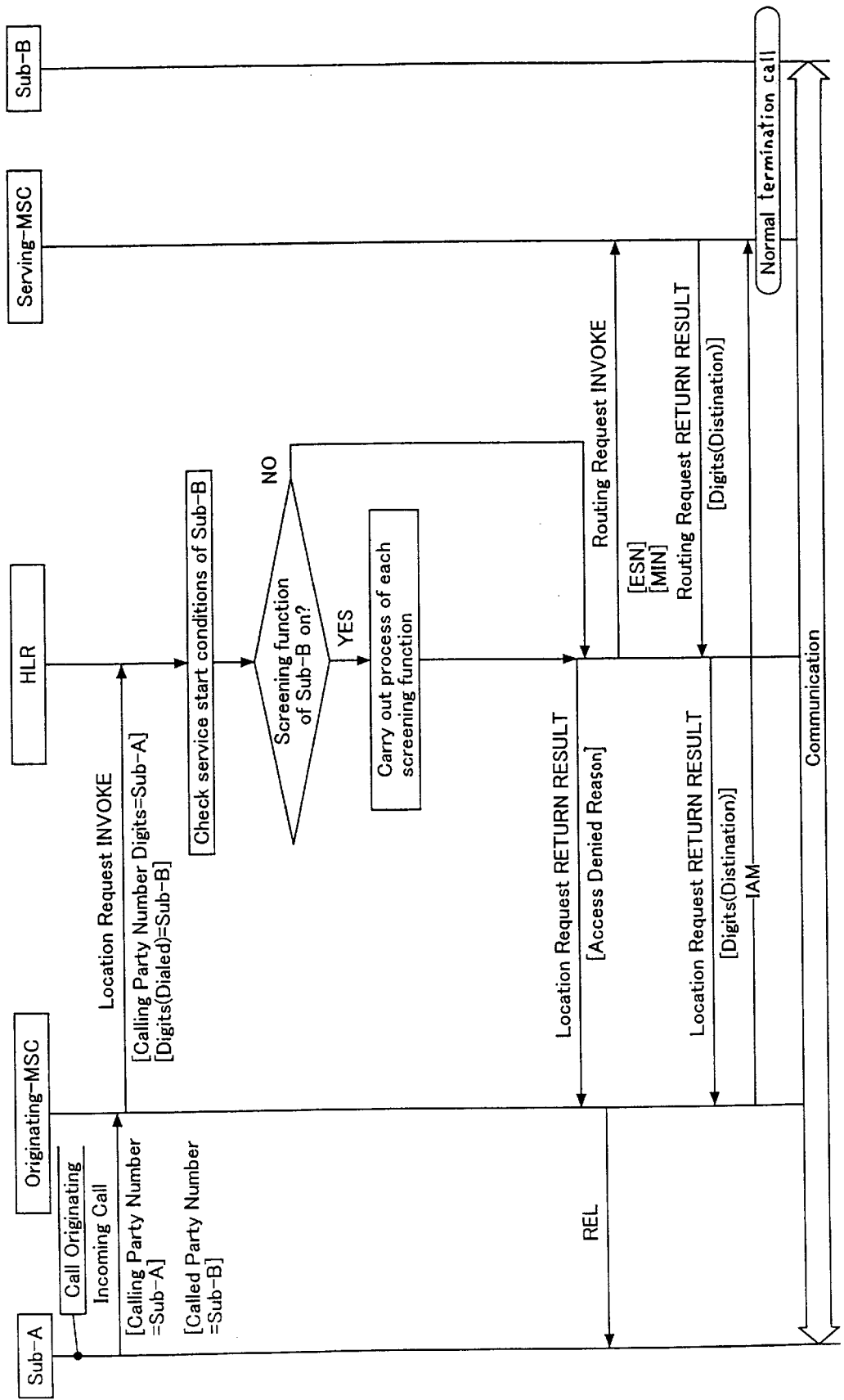
FIG. 2 is a diagram generally showing an example of a conventional signaling sequence with the screening function.

In this first embodiment, a calling party telephone number which is permitted to make a forced reception at a called party telephone number is registered in advance in a table of authorized reception forcing calling party telephone numbers within the HLR of the home memory center 5(1) shown in FIG. 1. The forced reception refers to a process in which a specific caller forces a subscriber of a screening service to make a reception even in a state where the screening function of this subscriber is turned ON. Hence, the specific caller, such as a network manager, who is authorized to make the forced reception at the called party telephone number is registered in the home memory center 5(1).

When a network manager A originates a call with a calling party telephone number Sub-A and a called party telephone number Sub-B, the originating-MSC 3(1) inquires the position information and the like of a destination subscriber B to the home memory center 5(1) by a location request INVOKE. The position information of the destination subscriber B includes information of a cell in which the subscriber B is located. The home memory center 5(1) refers to the table within the HLR, to check whether or not the calling party telephone number Sub-A of the network manager A is listed in the table.

If the calling party telephone number Sub-A of the network manager A is registered in the table, the process of each screening function to which the destination subscriber B at the serving end is subscribed is skipped in order to carry out the forced reception. In other words, the screening function of the destination subscriber B is avoided, so as to control the mobile terminal 1B of the destination subscriber B at the serving end to make a reception.

More particularly, the home memory center 5(1) sends a routing request INVOKE to the serving-MSC 3(3). When a routing response RETURN RESULT is received from the serving-MSC 3(3) in response to the routing request INVOKE, the home memory center 5(1) sends a location response RETURN RESULT to the originating-MSC 3(1) in response to the routing response RETURN RESULT. Hence, the originating-MSC 3(1) sends an initial address message IAM or the like to the serving-MSC 3(3). The serving-MSC 3(3) carries out a normal termination call sequence between the destination subscriber B in response to the initial address message IAM or the like, and sets a line. As a result, a communication becomes possible between the network manager A and the destination subscriber B.

On the other hand, if the calling party telephone number Sub-A of the network manager A is not registered in the table within the HLR of the home memory center 5(1), the forced reception at the destination subscriber B is not permitted, and in this case, the process carried out becomes the same as that with respect to a normal call. In other words, the service start conditions of the destination subscriber B are checked, and a judgement is made to determine whether or not the screening function of the subscriber B is turned ON. If the screening function of the destination subscriber B is turned ON, each process of the screening function, such as releasing the call, is carried out, and a location response RETURN RESULT with the access rejecting reasons is returned to the originating-MSC 3(1). Thus, the originating-MSC 3(1) releases the connection to the network manager A. In addition, if the screening function of the destination subscriber B is turned OFF, the serving-MSC 3(3) carries out the normal termination call sequence between the subscriber B.

Second Embodiment

Figure 4:
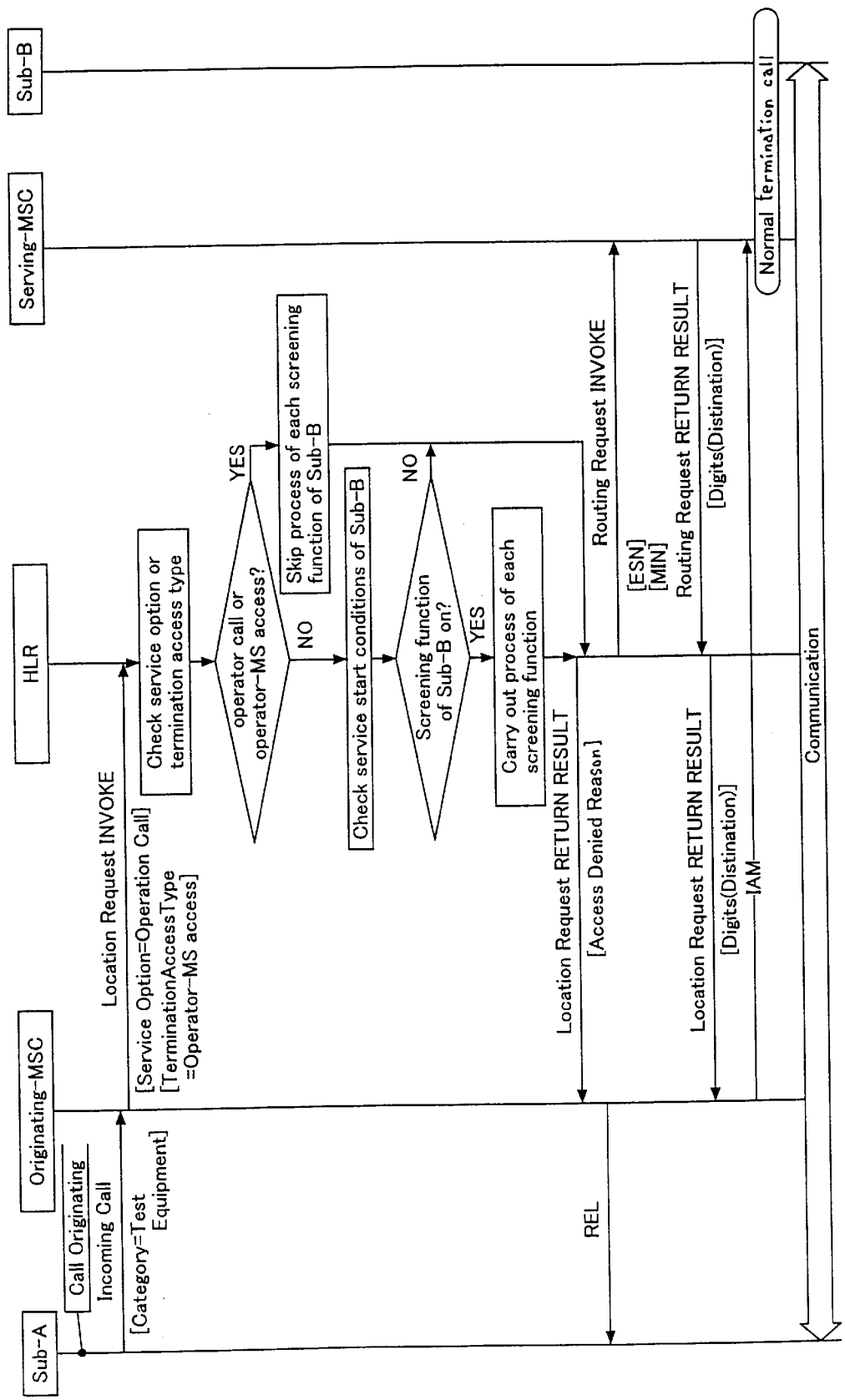
FIG. 4 is a diagram generally showing a signaling sequence of a second embodiment of the reception forcing method for mobile communication system according to the present invention.

FIG. 4 is a diagram generally showing a signaling sequence of a second embodiment of the reception forcing method for mobile communication system according to the present invention. This second embodiment of the reception forcing method is applied to a second embodiment of the mobile communication system according to the present invention having the same basic system structure as the conventional mobile communication system shown in FIG. 1, except for the operation described hereunder, and employs a second embodiment of the managing center according to the present invention.

In this second embodiment, categories of callers who are permitted to make the forced reception are registered in advance in a table of authorized reception forcing caller categories within the HLR of the home memory center 5(1). For example, these categories include "operator call" which indicates a call from the network manager, "operator-MS access" which indicates a maintenance access from the network manager, and the like.

When the source subscriber A originates a call with a caller category "test equipment", the originating-MSC 3(1) makes an inquiry of the position information and the like of the destination subscriber B to the home memory center 5(1) by a location request INVOKE, and the caller category, such as the "operator call" which indicates the service option and the "operator MS-access" which indicates the termination access type is notified to the home memory center 5(1). The home memory center 5(1) refers to the table within the HLR to check whether or not the notified caller category of the source subscriber A is permitted to make the forced reception.

If the notified caller category of the source subscriber A is registered in the table within the HLR of the home memory center 5(1), the process of each screening function to which the destination subscriber B is subscribed is skipped, and the mobile terminal 1B of the destination subscriber B is controlled in order to carry out the forced reception. The process at the time of this forced reception is the same as that of the first embodiment described above, and a description thereof will be omitted.

On the other hand, if the caller category of the source subscriber A is not registered in the table within the HLR of the home memory center 5(1), the forced reception at the destination subscriber B is not permitted, and in this case, the process carried out becomes the same as that with respect to a normal call.

Third Embodiment

Figure 5:
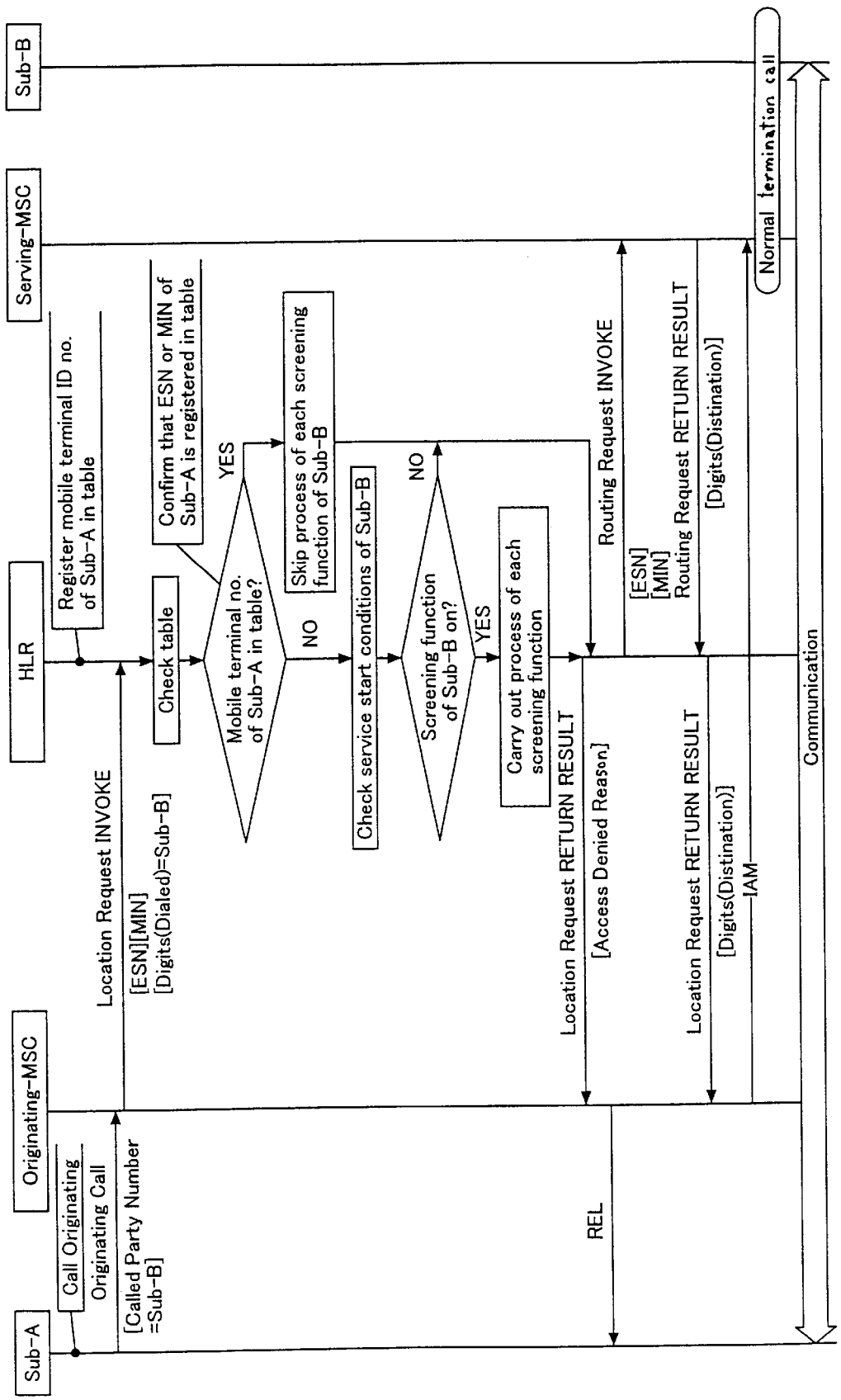
FIG. 5 is a diagram generally showing a signaling sequence of a third embodiment of the reception forcing method for mobile communication system according to the present invention.

FIG. 5 is a diagram generally showing a signaling sequence of a third embodiment of the reception forcing method for mobile communication system according to the present invention. This third embodiment of the reception forcing method is applied to a third embodiment of the mobile communication system according to the present invention having the same basic system structure as the conventional mobile communication system shown in FIG. 1, except for the operation described hereunder, and employs a third embodiment of the managing center according to the present invention.

In this third embodiment, a judgement to determine whether or not to carry out the forced reception is made by use of a mobile terminal number such as ESN and MIN which is assigned to each mobile terminal so as to identify each of the individual mobile terminals. Accordingly, the mobile terminal number of the mobile terminal on the originating end which is permitted to make the forced reception is registered in advance in a table of authorized a reception forcing mobile terminal numbers within the HLR of the home memory center 5(1).

For example, the source subscriber A originates a call by dialing the called party telephone number Sub-B, and the mobile terminal number of the source subscriber A is also notified to the originating-MSC 3(1). The originating-MSC 3(1) notifies the called party telephone number Sub-B and the mobile terminal number ESN or MIN to the home memory center 5(1). The home memory center 5(1) refers to the table within the HLR to check whether or not the mobile terminal number within the received message is registered in the table. If the mobile terminal number of the source subscriber A is registered in the table, the forced reception is permitted with respect to the call originated from the source subscriber A. In this case, the process of each screening function to which the destination subscriber B is subscribed is skipped, and the mobile terminal 1B of the destination subscriber B is controlled in order to carry out the forced reception, similarly to the embodiments described above. On the other hand, if the mobile terminal number of the source subscriber A is not registered in the table within the HLR of the home memory center 5(1), the forced reception at the destination subscriber B is not permitted, and in this case, the process carried out becomes the same as that with respect to a normal call.

Fourth Embodiment

FIG. 6 is a diagram generally showing a signaling sequence of a fourth embodiment of the reception forcing method for mobile communication system according to the present invention. This fourth embodiment of the reception forcing method is applied to a fourth embodiment of the mobile communication system according to the present invention having the same basic system structure as the conventional mobile communication system shown in FIG. 1, except for the operation described hereunder, and employs a fourth embodiment of the managing center according to the present invention.

In this fourth embodiment, an access number which permits the forced reception is registered in advance in a table of forced reception permitting access numbers within the HLR of the home memory center 5(1). When the network manager A wishes to make the forced reception at the destination subscriber B, for example, this access number is the called party telephone number of the destination subscriber B which is first dialed by the network manager A.

When the network manager A originates a call by dialing the access number as the called party telephone number of the destination subscriber B, the originating-MSC 3(1) notifies this access number to the home memory center 5(1) by a location request INVOKE. The home memory center 5(1) checks whether or not the access number within the received message is registered in the table within the HLR. If the access number is registered in the table, the reception process of the destination subscriber B is continued regardless of the service start state of the screening function of the destination subscriber B. In other words, the destination subscriber B carries out a process of setting a forced reception enable, and requesting the network manager A to input the called party telephone number (final destination telephone number) of the destination subscriber B. More particularly, the home memory center 5(1) sends an instruction INVOKE which requests the network manager A to input the called party telephone number Sub-B, and the originating-MSC 3(1) carries out an operation of inputting the called party telephone number Sub-B between the network manager A in response to the instruction INVOKE. The originating-MSC 3(1) sends the input called party telephone number Sub-B again to the home memory center 5(1). The home memory center 5(1) confirms that the forced reception is permitted, and skips the process of each screening function to which the destination subscriber B is subscribed, so as to carry out the forced reception similarly as in each of the embodiments described above.

On the other hand, if the called party telephone number Sub-B within the message which is received from the originating-MSC 3(1) is not an access number which permits the forced reception, the home memory center 5(1) returns a location response RETURN RESULT with the access rejecting reasons to the originating-MSC 3(1), and the originating-MSC 3(1) releases the connection to the network manager A.

Fifth Embodiment

FIG. 7 is a diagram generally showing a signaling sequence of a fifth embodiment of the reception forcing method for mobile communication system according to the present invention. This fifth embodiment of the reception forcing method is applied to a fifth embodiment of the mobile communication system according to the present invention having the same basic system structure as the conventional mobile communication system shown in FIG. 1, except for the operation described hereunder, and employs a fifth embodiment of the managing center according to the present invention.

In this fifth embodiment, measures are taken so as to prevent unauthorized use of the forced reception by modifying the fourth embodiment described above. More particularly, the input of a password in addition to dialing the access number is a necessary condition for starting the forced reception. The password is registered in advance in a table within the HLR of the home memory center 5(1), together with the access number for permitting the forced reception.

The process from the time when the network manager A calls the access number of the destination subscriber B until the home memory center 5(1) checks whether or not the called party telephone number within the received message is the registered access number which permits the forced reception, is the same as that of the fourth embodiment described above. This fifth embodiment differs from the fourth embodiment in that, if the called party telephone number within the received message is the registered access number which permits the forced reception, a process is further started to request the input of the password.

In other words, the home memory center 5(1) sends with respect to the originating-MSC 3(1) an instruction INVOKE which requests the network manager A to input the password. In response to this instruction INVOKE, the originating-MSC 3(1) caries out a password input operation between the network manager A, and sends the input password again to the home memory center 5(1). The home memory center 5(1) compares the password which is input by the network manager A with one or more passwords which are registered in advance in the table, and if no matching password is found, the forced reception is not permitted and the call of the network manager A is released. On the other hand, if a matching password is found, the forced reception is permitted, and the process carried out thereafter becomes the same as that of the fourth embodiment described above subsequent to the process of requesting the input of the called party telephone number.

Of course, it is possible to appropriately combine the above described embodiments to suit the application.

In each of the embodiments described above, the mobile communication system employs the CDMA. However, the present invention is of course similarly applicable to mobile communication systems which employ other access systems such as the time division multiple access (TDMA) and frequency division multiple access (FDMA).

Further, the present invention is not limited to these embodiments, but various variations and modifications may be made without departing from the scope of the present invention.

What is claimed is:

1. A reception forcing method for a mobile communication system which includes a managing center, comprising the steps of:
    (a) registering in advance identification information which is related to each caller permitted to make a forced reception in the managing center;
    (b) originating a call from a caller by adding identification information of the caller when making a forced reception at a destination subscriber;
    (c) forcing a reception at the destination subscriber by avoiding a screening function of the destination subscriber regardless of whether or not the screening function of the destination subscriber is turned on, if the identification information of the caller is registered in the managing center; and
    d) forcing a reception at the destination subscriber if the identification information of the caller is not registered and the screening function of the destination subscriber is turned off.

2. The reception forcing method as claimed in claim 1, wherein the identification information of the caller includes a calling party telephone number.

3. The reception forcing method as claimed in claim 1, wherein the identification information of the caller includes a caller category.

4. The reception forcing method as claimed in claim 1, wherein the identification information of the caller includes a mobile terminal number of the caller.

5. A reception forcing method for a mobile communication system which includes a managing center, comprising the steps of:
    (a) registering in advance each access number which permits a forced reception in the managing center;
    (b) originating a call from a caller by using a called party telephone number as the access number when making a forced reception at a destination subscriber;
    (c) forcing a reception at the destination subscriber by avoiding a screening function of the destination subscriber regardless of whether or not the screening function of the destination subscriber is turned on, by obtaining the called party telephone number from the caller if the access number of the destination subscriber is registered in the managing center; and
    (d) forcing a reception at the destination subscriber if the access number of the destination subscriber is not registered and the screenings function of the destination subscriber is turned off.

6. The reception forcing method as claimed in claim 5, wherein said step (a) further registers a password in advance together with the access number in the managing center, and said step (c) requests the caller to input the password and obtains the called party telephone number of the destination subscriber if the input password matches the password registered in the managing center.

7. A mobile communication system comprising:
    a managing center, managing position information of mobile terminals, and registering in advance identification information which is related to each caller permitted to make a forced reception;
    means for originating a call from a caller by adding identification information of the caller when making a forced reception at a destination subscriber;
    means for forcing a reception at the destination subscriber by avoiding a screening function of the destination subscriber regardless of whether or not the screening function of the destination subscriber is turned on, if the identification information of the caller is registered in the managing center; wherein
    said means for forcing a reception at the destination subscriber forces a reception if the identification information of the caller is not registered and the screening function of the destination subscriber is turned off.

8. The mobile communication system as claimed in claim 7, wherein the identification information of the caller includes a calling party telephone number.

9. The mobile communication system as claimed in claim 7, wherein the identification information of the caller includes a caller category.

10. The mobile communication system as claimed in claim 7, wherein the identification information of the caller includes a mobile terminal number of the caller.

11. A mobile communication system comprising:
    a managing center, managing position information of mobile terminals, and registering in advance each access number which permits a forced reception;
    means for originating a call from a caller by using a called party telephone number as the access number when making a forced reception at a destination subscriber; and
    means for forcing a reception at the destination subscriber by avoiding a screening function of the destination subscriber regardless of whether or not the screening function of the destination subscriber is turned ON, by obtaining the called party telephone number from the caller if the access number of the destination subscriber is registered in the managing center;
    wherein the means for forcing a reception at the destination subscriber force a reception if the access number of the destination subscriber is not registered and the screening function of the destination subscriber is turned off.

12. The mobile communication system as claimed in claim 11, wherein said managing center further registers a password in advance together with the access number, and said means for forcing the reception requests the caller to input the password and obtains the called party telephone number of the destination subscriber if the input password matches the password registered in said managing center.

13. A managing center for managing position information of mobile terminals used in a mobile communication system, comprising:

registering means for registering in advance identification information which is related to each caller permitted to make a forced reception;

means for receiving a call which is originated from a caller, added with identification information of the caller, and instructing a forced reception at a destination subscriber; and means for forcing a reception at the destination subscriber by avoiding a screening function of the destination subscriber regardless of whether or not the screening function of the destination subscriber is turned ON, if the identification information of the caller is registered in the registering means; wherein said means for forcing a reception at the destination subscriber forces a reception if the identification information of the caller is not registered and the screening function of the destination subscriber is turned off.

14. The managing center as claimed in claim 13, wherein the identification information includes at least one of a calling party telephone number, a caller category, and a mobile terminal number of the caller.

15. A managing center for managing position information of mobile terminals used in a mobile communication system, comprising:

registering means for registering in advance each access number which permits a forced reception;

means for receiving a call originated from a caller, using a called party telephone number as the access number, and instructing a forced reception at a destination subscriber; and means for forcing a reception at the destination subscriber by avoiding a screening function of the destination subscriber regardless of whether or not the screening function of the destination subscriber is turned ON, by obtaining the called party telephone number from the caller if the access number of the destination subscriber is registered in the registering means; wherein said means for forcing a reception at the destination subscriber forces a reception if the identification information of the caller is not registered and the screening function of the destination subscriber is turned off.

16. The managing center as claimed in claim 15, wherein said registering means further registers a password in advance together with the access number, and said means for forcing the reception requests the caller to input the password and obtains the called party telephone number of the destination subscriber if the input password matches the password registered in said registering means.

17. A mobile communication system comprising:

a managing center, managing position information of mobile terminals, and registering in advance identification information which is related to each caller permitted to make a forced reception;

means for originating a call from a caller by adding identification information of the caller when making a forced reception at a destination subscriber; and means for forcing a reception at the destination subscriber by avoiding a screening function of the destination subscriber regardless of whether or not the screening function of the destination subscriber is turned ON, if the identification information of the caller is registered in the managing center.

18. A mobile communication system comprising:

a managing center, managing position information of mobile terminals, and registering in advance each access number which permits a forced reception;

means for originating a call from a caller by using a called party telephone number as the access number when making a forced reception at a destination subscriber; and means for forcing a reception at the destination subscriber by avoiding a screening function of the destination subscriber regardless of whether or not the screening function of the destination subscriber is turned ON, by obtaining the called party telephone number from the caller if the access number of the destination subscriber is registered in the managing center.

19. A managing center for managing position information of mobile terminals used in a mobile communication system, comprising;

registering means for registering in advance identification information which is related to each caller permitted to make a forced reception;

means for receiving a call which is originated from a caller, added with identification information of the caller, and instructing a forced reception at a destination subscriber; and means for forcing a reception at the destination subscriber by avoiding a screening function of the destination subscriber regardless of whether or not the screening function of the destination subscriber is turned ON, if the identification information of the caller is registered in the registering means.

20. A managing center for managing position information of mobile terminals used in a mobile communication system, comprising:

registering means for registering in advance each access number which permits a forced reception;

means for receiving a call originated from a caller, using a called party telephone number as the access number, and instructing a forced reception at a destination subscriber; and means for forcing a reception at the destination subscriber by avoiding a screening function of the destination subscriber regardless of whether or not the screening function of the destination subscriber is turned ON, by obtaining the called party telephone number from the caller if the access number of the destination subscriber is registered in the registering means.

\* \* \* \* \*